United States Patent [19]

Bott

[11] 4,293,159

[45] Oct. 6, 1981

[54] FLEXIBLE WIND DEFLECTOR

[76] Inventor: John A. Bott, 931 Lakeshore Dr., Grosse Pointe Shores, Mich. 48236

[21] Appl. No.: 39,263

[22] Filed: May 16, 1979

[51] Int. Cl.³ .............................................. B62D 37/02
[52] U.S. Cl. ...................................... 296/91; 296/1 S; 105/2 A
[58] Field of Search .................. 296/1 S, 91; 180/313, 180/1 FV; 105/2 A; 280/154.5 R

[56] References Cited

U.S. PATENT DOCUMENTS

| Re. 26,538 | 3/1969 | Bott | 224/42.1 |
|---|---|---|---|
| D. 204,931 | 5/1966 | Bott | D14/6 |
| 3,000,663 | 9/1961 | Lucchesi | 296/1 S |
| 3,560,044 | 2/1971 | Helm | 296/1 S X |
| 3,799,580 | 3/1974 | McGuire | 280/154.5 R |
| 3,799,603 | 3/1974 | Bott | 296/1 S |
| 3,856,193 | 12/1974 | Bott | 224/42.1 D |
| 4,043,587 | 8/1977 | Giallourakis et al. | 296/91 |
| 4,119,339 | 10/1978 | Heimburger | 296/1 S |
| 4,155,585 | 5/1979 | Bott | 296/1 S |
| 4,170,377 | 10/1979 | Ingram | 296/1 S |
| 4,236,592 | 12/1980 | Ziegler | 296/91 X |

Primary Examiner—Joseph F. Peters, Jr.
Assistant Examiner—Norman L. Stack, Jr.
Attorney, Agent, or Firm—Harness, Dickey & Pierce

[57] ABSTRACT

A speed responsive wind deflector comprises a flexible cantilever vane that is attached along one edge to a cross bar mounted on the roof of an automotive vehicle.

9 Claims, 2 Drawing Figures

U.S. Patent     Oct. 6, 1981     4,293,159
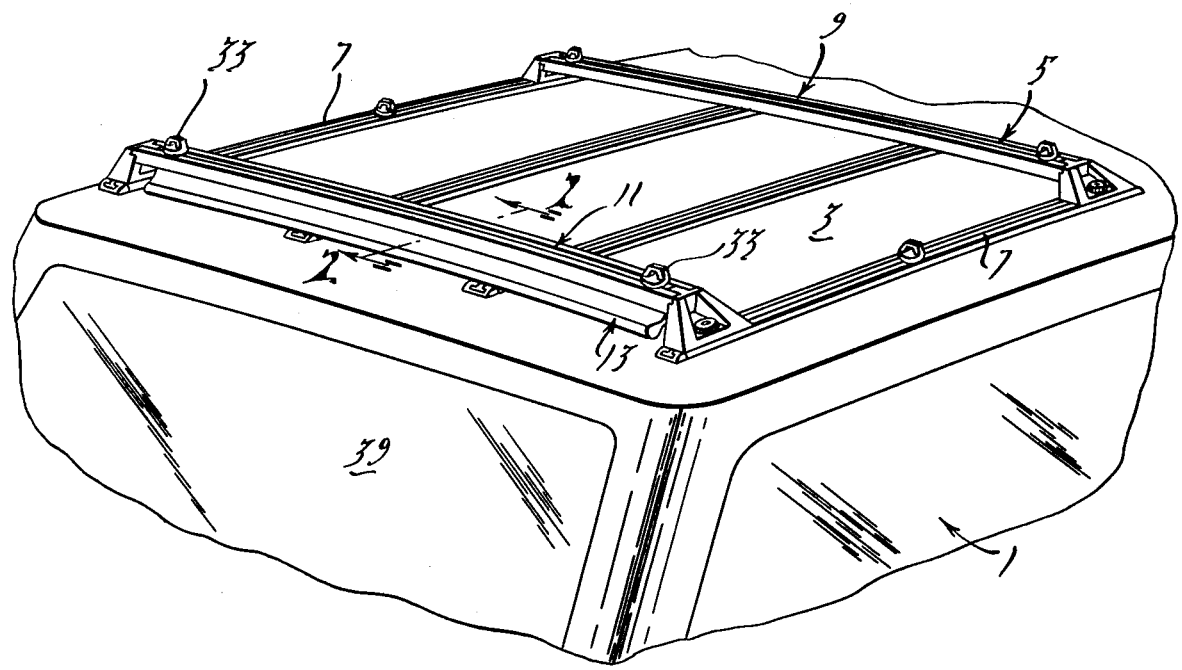
FIG. 1.
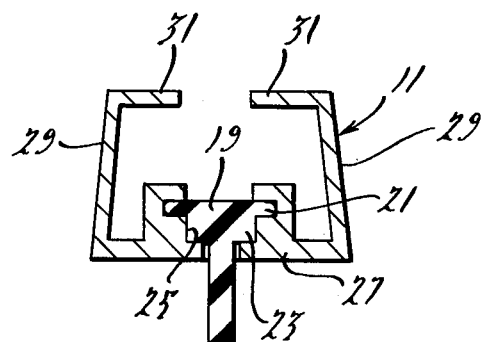
FIG. 2.
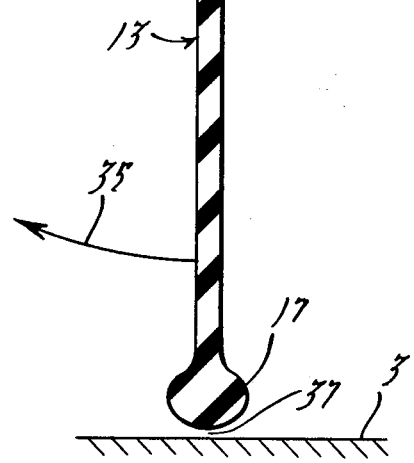

FLEXIBLE WIND DEFLECTOR

RELATED PATENTS AND APPLICATIONS

My U.S. Pat. No. 3,330,454 issued July 11, 1967 and my copending U.S. application, Ser. No. 798,575, filed May 19, 1977, entitled Variable Position Wind Deflector, now U.S. Pat. No. 4,155,585, show wind deflector designs that I have previously developed. My U.S. application, Ser. No. 9,608 filed Feb. 5, 1979 now U.S. Pat. No. 4,239,139 shows a roof-top article carrier construction which may be used to support the wind deflector of this invention.

BRIEF SUMMARY OF THE INVENTION

It is the purpose of this invention to provide a roof-top wind deflector for use on automobiles which functions to reduce sound ordinarily associated with similar devices.

The invention accomplishes this purpose by means of a deflector that is speed responsive and this is achieved in preferred form by means of a simple construction wherein the deflector is a flexible vane fixed along its top horizontal edge to a cross bar mounted on the roof of the vehicle. Preferably, the cross bar is a part of a luggage rack or roof-mounted article carrying system. With this mounting on a cross bar, the vane bends elastically as a cantilever under the pressure of air flowing against it. As the speed of the vehicle increases, the slot-like opening between the bottom of the vane and the vehicle roof also increases to accomodate the increase in the rate of air flow relative to the roof of the vehicle and minimize resistance to flow past the deflector. Turbulence and other noise producing phenomena associated with high velocity air flow past a flow-restricting opening are therefore minimized to provide a relatively quiet wind deflecting system. Throughout the speed range of the vehicle, the vane continues to function as means to direct air flow down across the rear window of the vehicle.

DESCRIPTION OF THE DRAWINGS

FIG. 1 is a perspective view, partly broken away, of an automobile having a roof-top mounted article carrier in accordance with my copending application, Ser. No. 9,608, filed Feb. 5, 1979, which includes a cross bar on which the wind deflector of this invention is mounted, the deflector being shown in a bent condition corresponding to forward movement of the vehicle; and FIG. 2 is an enlarged cross section along the line 2—2 of FIG. 1 showing the deflector in a neutral, unloaded condition.

DESCRIPTION OF THE INVENTION

An automotive vehicle 1 has a substantially flat, horizontal roof-top surface 3 on which is mounted an article supporting system 5 which comprises fixed, elongated, relatively flat mounting rails 7 extending lengthwise of the vehicle and removable front and rear cross bars 9 and 11 mounted on the rails for adjustment fore and aft by means of fixtures 11 at their opposite ends. A wind deflector baffle or vane 13 embodying the invention is attached to the rear cross bar 11.

The deflector 13 is preferably of one piece and constructed of a flexible, elastic, rubberlike, synthetic plastic material of a known commercial composition. It is basically a thin sheet as evidenced by the flat central web section 15 but it preferably is enlarged into a bulb or rounded bead 17 at its bottom edge and into an enlarged, roughly T-shaped holding section 19 at its upper edge. The holding section 19 comprises a flange 21 forming the outer part of the top edge of the vane and a narrower, rectangular section 23 located between the flange 21 and the web section 15. These structural features are each an integral part of a flexible resilient, monolithic vane and the various corners are suitably radiused to minimize zones of stress concentration that might lead to premature tearing or fracture.

The holding section 19 closely fits into and inside of a groove 25 that is a part of the base section 27 of the hollow, extruded metal cross bar 11. The groove 25 opens out of the ends of the cross bar so that the vane holding section may be telescopically inserted into it and moved longitudinally of the cross bar into the final assembled position illustrated. In cross section, the bar 11 is roughly U-shaped with side legs 29 extending upwardly from the base section. The top ends of the side legs are turned inwardly to form overhanging flanges 31. This configuration of the top of the cross bar enables it to adjustably support tie down members 33 in a manner more fully disclosed in my aforementioned application and forming no special part of this invention.

The joint between holding section 19 and the walls of groove 25 is essentially fixed so that air pressure on the front face of the vane causes it to deflect in the bending mode of a cantilever beam with a fixed end condition. The vane therefore resiliently and yieldably opposes deflection in an elastic, springlike manner and is urged by its internal state of stress to return to the unloaded position of FIG. 2 wherein the web 15 is substantially perpendicular to the surface 3 of the vehicle roof.

When the vehicle 1 is standing still the vane will occupy the position of FIG. 2. However, when the vehicle moves in a forward direction it will carry the web 15 against a mass of air which will tend to remain stationary and therefore create pressure on the front face of the web. This will cause the vane to bend or deflect as an elastic beam about its fixed end 19 in the direction of the arrow 35 thereby increasing the width of the slot-like air flow space 37 between the bottom of the bead 17 and the roof surface 3. The degree of deflection and the size of space 37 depend upon the pressure of air on the vane which, in turn, is proportional to the forward speed of the vehicle. The size or area of the flow opening 37 is a function of vehicle speed and is self-adjusting in accordance with the rate of air flow past the vane. This characteristic will tend to smooth out the flow, i.e., reduce turbulence as compared with a fixed deflector, and to minimize deflector generated sound. Furthermore, since it is resilient, the flap-like vane can flex in response to pressure pulses (acoustic or otherwise) and this will tend to absorb and attenuate them along with any associated sound.

It is apparent that despite various degrees of movement the vane will continuously serve to baffle air flow down across the rear window 39 and side of the vehicle to obtain the known benefits of wind deflection. However, with the resilient self-adjusting construction shown sound generation will be minimized and sound attenuation enhanced to add to the overall utility of the system.

Modifications in the specific structural details shown may be made without departing from the spirit and scope of the invention.

What is claimed is:

1. In an article carrier for roof top mounting on an automotive type vehicle, a pair of mounting rails for mounting on the surface of the vehicle roof to extend lengthwise of the vehicle, and a relatively resilient wind deflector to extend transversely of the length of the vehicle and adapted to direct air flow down across the rear side of the vehicle, means attached to said deflector along the entire length thereof for mounting the wind deflector on said mounting rails so that it extends transversely of the length of the vehicle and so that it is deformable under influence of wind in the direction of the length of the vehicle.

2. In a wind deflector construction for roof top mounting on an automotive type vehicle, an elongated resilient wind deflector movable in response to the pressure of air on it and adapted to be mounted in a position to extend transversely across the roof top of a vehicle adjacent the rear thereof in a location to direct air flow across the roof down across the rear of the vehicle, and means including a crossbar secured along the entire length of said deflector for mounting said wind deflector in said position for movement in a direction lengthwise of the vehicle.

3. A wind deflector construction as set forth in claim 2 wherein said deflector comprises an elongated vane and said means comprises a cross bar and supports for mounting said cross bar on said roof top, said deflector being mounted on said cross bar.

4. A wind deflector construction as set forth in claim 3 wherein said vane is flexible and bendable elastically in response to the pressure of air flowing against it.

5. A wind deflector construction as set forth in claim 4 wherein said vane is substantially flat and rectangular and has a top edge, said top edge being in engagement with and attached to said cross bar.

6. A wind deflector construction as set forth in claim 5 wherein said top edge is fixed to said cross bar in a non-pivotal joint providing a fixed end condition for cantilever bending of the vane in response to air pressure on it.

7. A wind deflector construction comprising an elongated rigid crossbar having means at the ends thereof whereby it may be mounted in a horizontal position on and spaced above the roof of a vehicle, and an elongated, thin resilient and elastically flexible and bendable flaplike wind deflector supported and mounted on said crossbar to extend downwardly from the bottom thereof and substantially and yieldably close off the space between the bottom of the crossbar and the roof of a vehicle on which the crossbar is mounted, said deflector having an integral holding section along its top edge, said crossbar having a groove adapted to receive said holding section along the entire length thereof for supporting said deflector in place.

8. A wind deflector as set forth in claim 7 wherein said deflector has a substantially cylindrical bead forming its bottom edge.

9. The invention as set forth in claim 7 wherein said deflector is flexible in a fore and aft direction to provide a variable size air flow opening between it and the roof surface, said vane member being resiliently urged forwardly toward a minimum size air flow opening whereby the size of the opening is a function of vehicle speed.

* * * * *